Aug. 31, 1965    R. J. LANNEN    3,203,716
CONNECTING ROD AND PIVOT PIN CONNECTION
Filed Feb. 19, 1962    3 Sheets-Sheet 2
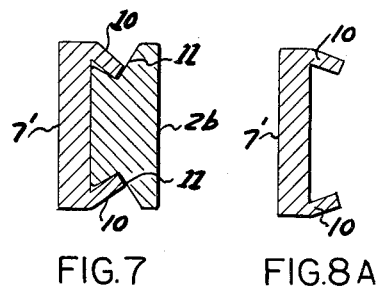
FIG.7    FIG.8A
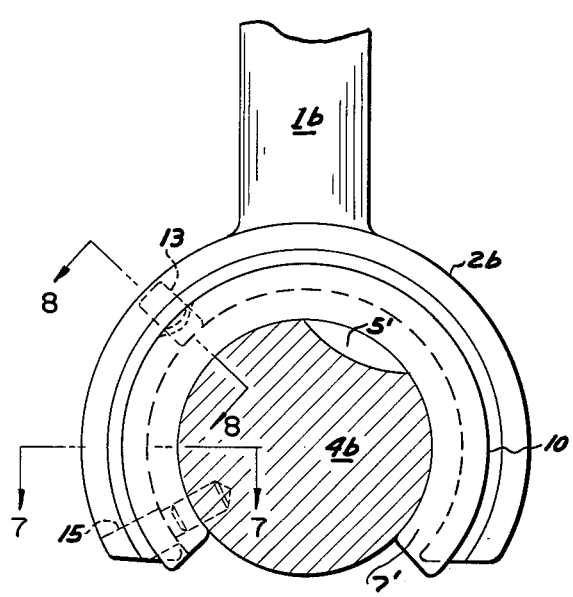
FIG.5
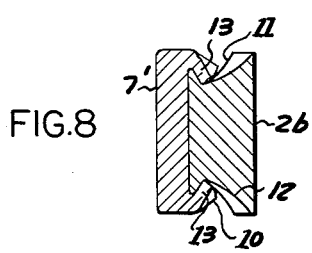
FIG.8
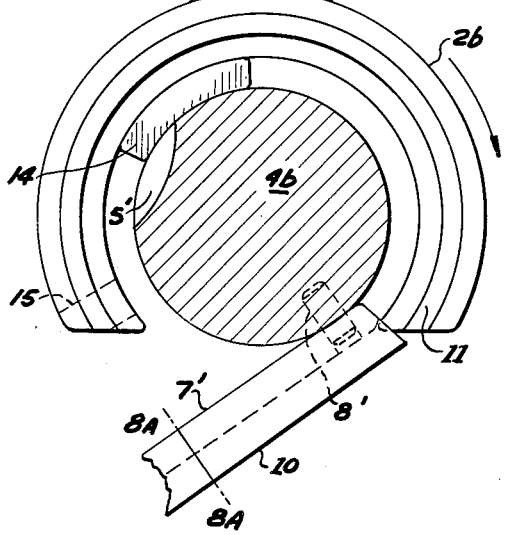
FIG.6
FIG.9
INVENTOR.
ROBERT J. LANNEN
BY
J.S. Murray
ATTORNEY Aug. 31, 1965 R. J. LANNEN 3,203,716
CONNECTING ROD AND PIVOT PIN CONNECTION
Filed Feb. 19, 1962 3 Sheets-Sheet 3
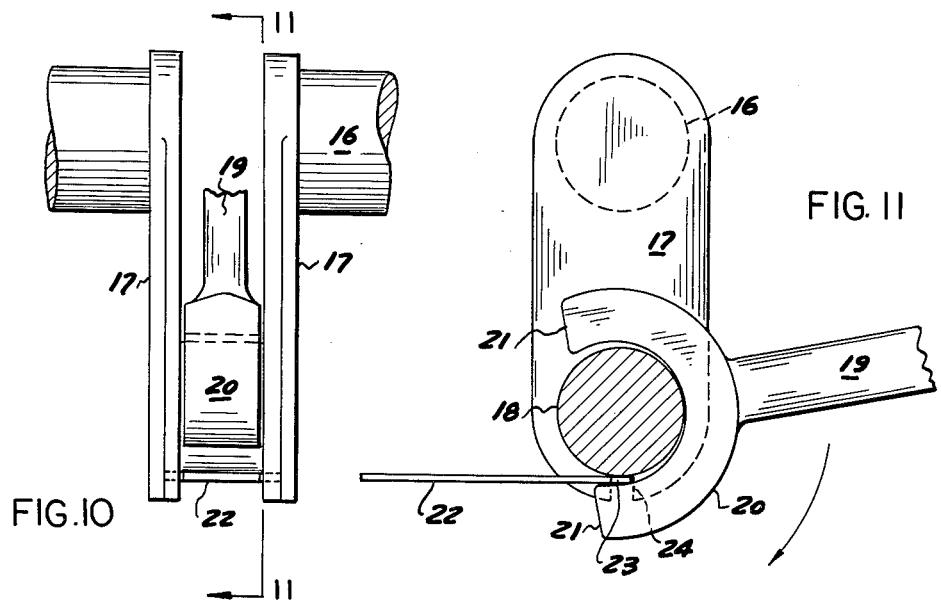
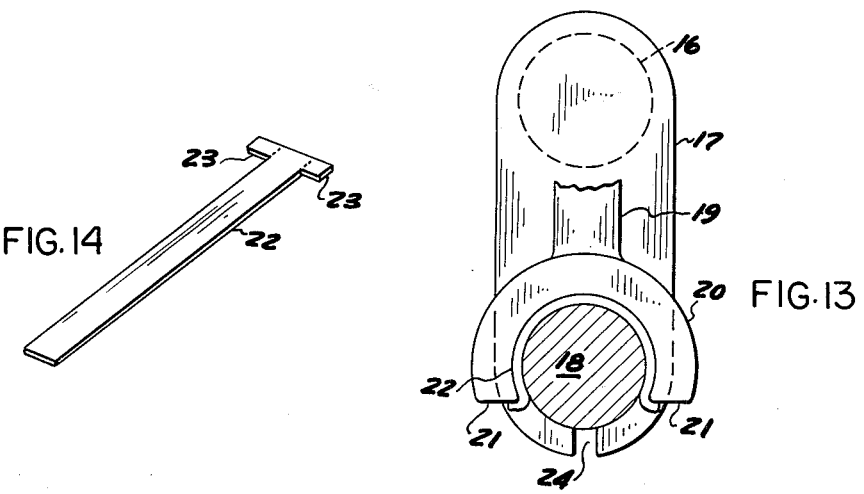
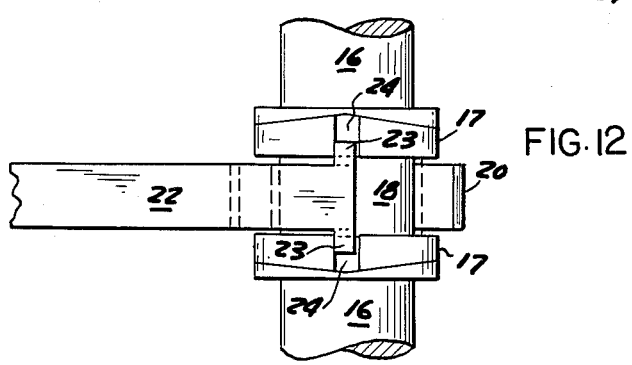
INVENTOR.
ROBERT J. LANNEN.
BY
*J.S. Murray*
ATTORNEY.

United States Patent Office 3,203,716
Patented Aug. 31, 1965

3,203,716
CONNECTING ROD AND PIVOT PIN
CONNECTION
Robert J. Lannen, Detroit, Mich., assignor to Micro-Poise Engineering and Sales Company, Detroit, Mich., a partnership
Filed Feb. 19, 1962, Ser. No. 174,069
2 Claims. (Cl. 287—93)

This invention relates to connecting rod and pivot pin connections and particularly to pivotal joints between connecting rods and crank pins. The invention further relates to the interengagement of a bearing and a shaft journaled in the bearing, when for any reason it is not feasible to effect the interengagement by a relative sliding of said parts along their coincident axes.

A common type of crank shaft has each of its crank pins rigidly mounted upon and between a pair of parallel spaced arms projecting rigidly and radially from the shaft. To apply a connecting rod to such a pin, it has been necessary to form the rod bearing in halves oppositely engaging the pin and bolted one to the other. If such a bearing includes a liner or bushing, the latter must be formed in semicylindrical halves rigidly fitted in the bearing halves.

An object of the invention is to form a connecting rod bearing with a gap proportioned in circumferential extent to permit lateral insertion of a crank pin in the bearing, thus simplifying the bearing construction and expediting assembly or disassembly.

Another object is to reduce the requisite size of the bearing gap and to thus increase retention of a crank pin in the bearing by forming the latter of an interior diameter predeterminedly exceeding the pin diameter, so that the inserted pin will have a certain clearance from the bearing, such clearance being then filled by a suitably proportioned elongated liner strip which is progressively thrust through the gap and into the clearance, being thus wrapped sufficiently around the crank pin to establish the latter and the bearing in a proper coaxial relation.

Another object is to temporarily anchor the leading end portion of the liner strip to the crank pin so that a relative rotation of the connecting rod and pin will exert the desired wrapping effect on the strip.

Another object is so connect the inserted liner to the bearing that relative rotation between these parts will be avoided in use of the assembly.

Another object is to preform the liner strip with a pair of spaced flanges which will straddle the bearing as the strip is subjected to the wrapping effect, and will apply pressure to the bearing due to such effect, thus opposing any relative rotation of the inserted strip and bearing.

These and various other objects are attained by the construction hereinafter described and illustrated in the accompanying drawings, wherein:

FIG. 5 is a similar view showing a modified type of liner in its inserted position with modified means for preventing relative rotation of the liner and bearing.

FIG. 6 shows an initial position of insertion of the liner strip appearing in FIG. 5.

Figure 1:
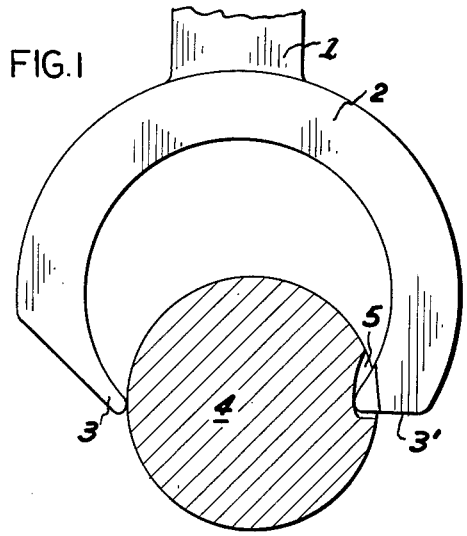
FIG. 1 is a cross-sectional view of a crank throw, as partially inserted in a connecting rod bearing in effecting assembly.
Figure 2:
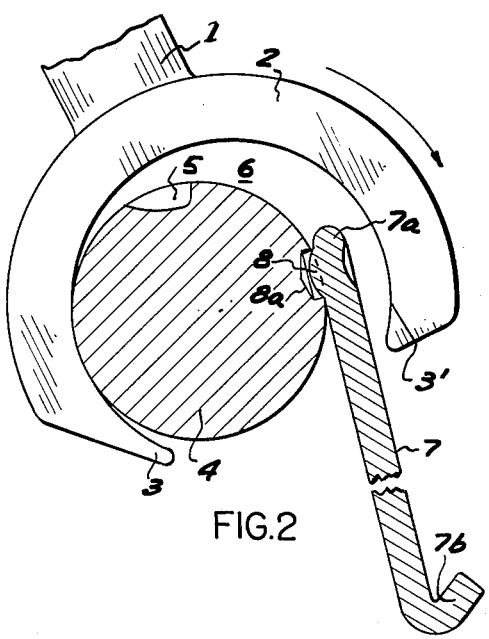
FIG. 2 is a cross-sectional view of a crank throw as partially retained in a connecting rod bearing, showing a liner strip in its initial position of insertion between the throw and bearing.
Figure 3:
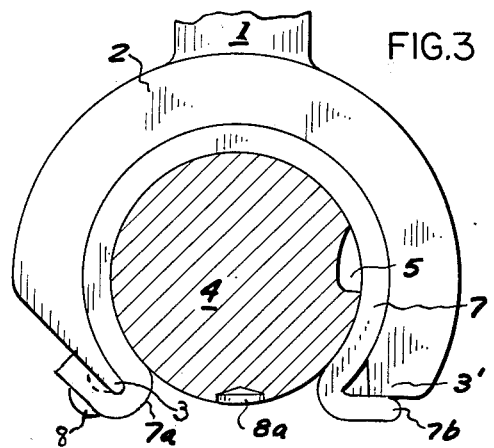
FIG. 3 is a similar view showing the assembly operation completed.
Figure 2A:
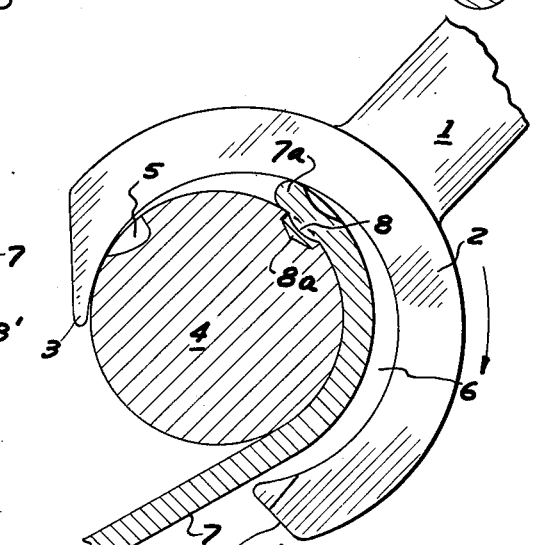
FIG. 2A is a similar view, showing the liner strip partially wrapped around a crank throw.

FIGS. 7 and 8 are cross-sections taken respectively on the lines 7—7 and 8—8 of FIG. 5.

FIG. 8A is a cross section taken on the line 8A—8A of FIG. 6.

FIG. 9 is a perspective view of a spacer used in assembling the construction shown in FIGS. 5 and 6.

FIG. 10 is an elevational view of another modification of the invention.

FIG. 11 is a cross-sectional view of the same, taken on the line 11—11 of FIG. 10, showing an initial wrapping position for the liner strip.

FIG. 12 is a bottom view of the same.

FIG. 13 is a view similar to to FIG. 11 but showing a final wrapping position for the liner strip.

FIG. 14 is a perspective view of a liner strip suited to the modification shown by FIGS. 10–13.

Referring now in greater detail to the invention and particularly to FIGS. 1, 2, 2A, and 3, a connecting rod 1 is terminally formed with a bearing 2 having a gap forming the bearing with circumferentially spaced ends 3 and 3', such gap permitting a crank pin 4 to be inserted in the bearing along the extended axis of the rod and being preferably centered at such axis. The gap is predeterminedly less in circumferential extent than the diameter of the pin 4, whereby the pin is afforded a desired retention in the bearing after insertion therein. As illustrated, the gap approximates ninety degrees in circumferential extent. To increase such retention, the pin 4 may be peripherally formed with a notch 5 accommodating one of the ends 3 and 3' as the pin is passed through the gap of the bearing, such notch materially reducing the necessary extent of the gap.

The interior diameter of the bearing predeterminedly exceeds the crank pin diameter, whereby a considerable arcuately elongated space 6 is formed between the bearing and pin, upon initial insertion of the latter. Following such insertion, a liner strip 7, which may be initially substantially straight, has a leading end portion thereof inserted through the bearing gap into the space 6 tangentially to the crank pin, as best appears in FIG. 2, said strip being so proportioned that, when wrapped around the pin, it will substantially fill the space 6, while forcing the bearing and pin to a coaxial relation. To progressively subject the strip 7 to the desired wrapping effect, the leading end 7a of the strip may be temporarily anchored to the pin 4, and the latter may be in any manner held stationary while the connecting rod is rotated about the pin (or vice versa) as indicated by the arrow, from the position shown in FIG. 2 to that appearing in FIG. 3. To attach the strip to the crank pin during assembly, it is preferred to form the strip at its leading end with a protuberance 8 and to form the pin 4 with a shallow peripheral socket 8a to receive said protuberance. Pressure applied to the strip by the bearing 2 during the wrapping operation retains the protuberance in the socket, avoiding any tendency of the strip to slide on the pin instead of wrapping on the latter. When the liner is in place, its ends 7a and 7b may be hooked out as in FIG. 3 against the ends 3 and 3' of the bearing, or, if preferred, the trailing end 7b may be preformed on the strip prior to assembly. Thus after assembly there is avoided material resistance to relative rotation of the pin and bearing.

Figure 4:
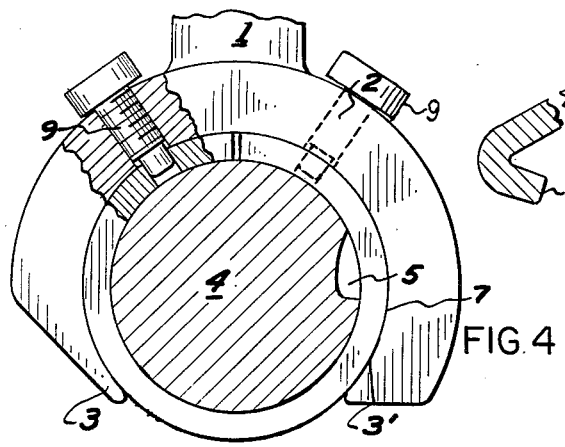
FIG. 4 is a similar view showing an alternative provision for preventing relative rotation of the bearing and liner.

In the construction shown in FIG. 4, the bent ends 7a and 7b are omitted and attachment of the liner 7 to the bearing is accomplished by a pair of screws 9 set radially into the bearing at opposite sides of the rod 1, with their inner ends socketed in the end portions of the liner.

The liner is preferably formed of a somewhat soft anti-friction metal, as aluminum, brass, or babbitt metal.

In the modification shown in FIGS. 5–9, the connecting rod 1b, bearing 2b, and crank pin 4b are substantially as in preceding description. This modification, however, preferably employs an originally straight liner strip 7' preformed with a pair of flanges 10 coextensive in length with the strip and similarly projecting from its opposite lateral margins with a slight convergency as best appears in FIG. 8A. The bearing has its lateral edges preformed with substantially V-shaped grooves 11 arcuately coextensive with such edges and receiving the flanges 10 and allowing these to progressively straddle the inner portion of the bearing as the strip 7' is wrapped around the crank pin 4b. Such wrapping may be accomplished by rotating the connecting rod as indicated by the arrow in FIG. 6, while the pin is in any desired manner restrained from rotation. Tensional circumferential stresses imposed on the flanges 10 as the strip is wrapped about the pin 4b will tend to bend the flanges toward each other and against the straddled portion of the bearing to frictionally resist relative rotation of the bearing and strip. To further resist any such rotation, a pair of opposite pockets 12 are machined in the grooved faces of the bearing, and the flanges 10 are indented into such pockets, as indicated at 13. It is preferred, in this modification, to insert a suitably curved spacer 14 through the bearing gap and loosely into the arcuate space between the crank pin and bearing, such spacer being initially diametrically opposed to the leading edge of the strip 7' and serving to position the pin 4b and bearing coaxially, thus reducing resistance to subsequent insertion of the strip. Such spacer will be ejected by the leading end of the liner strip as insertion of the latter is completed. Preliminary to assembly, a pin 8' is applied as in FIG. 6 to anchor the leading end of the strip 7' to the crank pin 4b during wrapping of the strip on the pin, and a radial aperture 15 in the bearing permits removal of the pin 8' upon completion of assembly.

In the modification shown by FIGS. 10–14, a crankshaft 16 rigidly carries a pair of spaced crank arms 17, radially projecting from said shaft and rigidly mounting a crank pin 18 upon and between their outer ends. A connecting rod 19 operates between the arms 17, being formed with a bearing 20 wherein the crank pin is journalled. The bearing is formed with a gap circumferentially extending between ends 21, such gap permitting the crank pin to be entered, laterally thereof, in the bearing. When so entered, there is sufficient space between the pin and bearing to operatively accommodate a suitably curved liner 22. Prior to insertion in the bearing, the liner has the form of an elongated strip which, as shown, is rectilinear. In the initial step of assembly, a leading end of said strip is inserted in the bearing gap to tangentially engage with the pin 18, and a pair of lugs 23 oppositely laterally formed on said end are set into a pair of aligned notches 24 oppositely formed in the outer ends of the arms 17. With the crank pin and shaft held stationary in any desired manner, the connecting rod and its bearing are now rotated in the direction of the arrow (FIG. 11), whereby the leading end 21 applies inward pressure to the liner, and the latter is progressively wrapped around the pin 18 and assumes the position appearing in FIG. 13. It is preferred to score the lugs 23 at their junctures with the liner strip so that they may be readily broken off when assembly is completed. Upon completion of the wrapping operation, the ends of the liner strip are outwardly bent against the bearing ends 21, preventing any rotation of the liner relative to the bearing. An advantage of the construction last described is that the inner strip is terminally held in place relative to the bearing without any reduction of the effective journal area of the crank pin.

By lining the bearing subsequent to insertion therein of a crank pin, there is obtained not only the antifriction effect usually derived from a liner, but the circumferential extent of the bearing gap is considerably reduced, with a corresponding increase in retention afforded the crank pin.

What I claim is:

1. A connecting rod and pivot pin connection, comprising a connecting rod terminally formed with an arcuate bearing, a liner inserted in said bearing, a pivot pin inserted in the lined bearing, the bearing and liner having substantially coextensive gaps, the liner being formed at opposite margins thereof with a pair of spaced arcuate outwardly projecting flanges, an inner portion of the bearing being fitted between such flanges, a lateral face of the bearing being formed with a pocket, one of said flanges having an indentation received in said pocket to prevent relative rotation of the bearing and liner.

2. A connecting rod and pivot pin connection comprising a conecting rod terminally formed with an arcuate bearing having a liner inserted therein, and a pivot pin journaled in the lined bearing, the bearing and liner having substantially coextensive gaps, the liner being formed at opposite margins thereof with a pair of spaced, arcuate, outwardly projecting flanges, an inner portion of the bearing being fitted between such flanges, the lateral faces of the bearing being formed with a pair of opposed pockets, and said flanges having a pair of opposed indentations received in said pockets to prevent relative rotation of the bearing and liner.

References Cited by the Examiner

UNITED STATES PATENTS

| | | |
|---|---|---|
| 1,006,632 | 10/11 | Coppock. |
| 1,264,144 | 4/18 | Berg. |
| 1,613,146 | 1/27 | Volare _____ 74—588 X |
| 1,873,245 | 8/32 | Abegg _____ 29—526 |
| 1,899,343 | 2/33 | MacKey et al. _____ 29—526 |

BROUGHTON G. DURHAM, *Primary Examiner.*